UNITED STATES PATENT OFFICE.

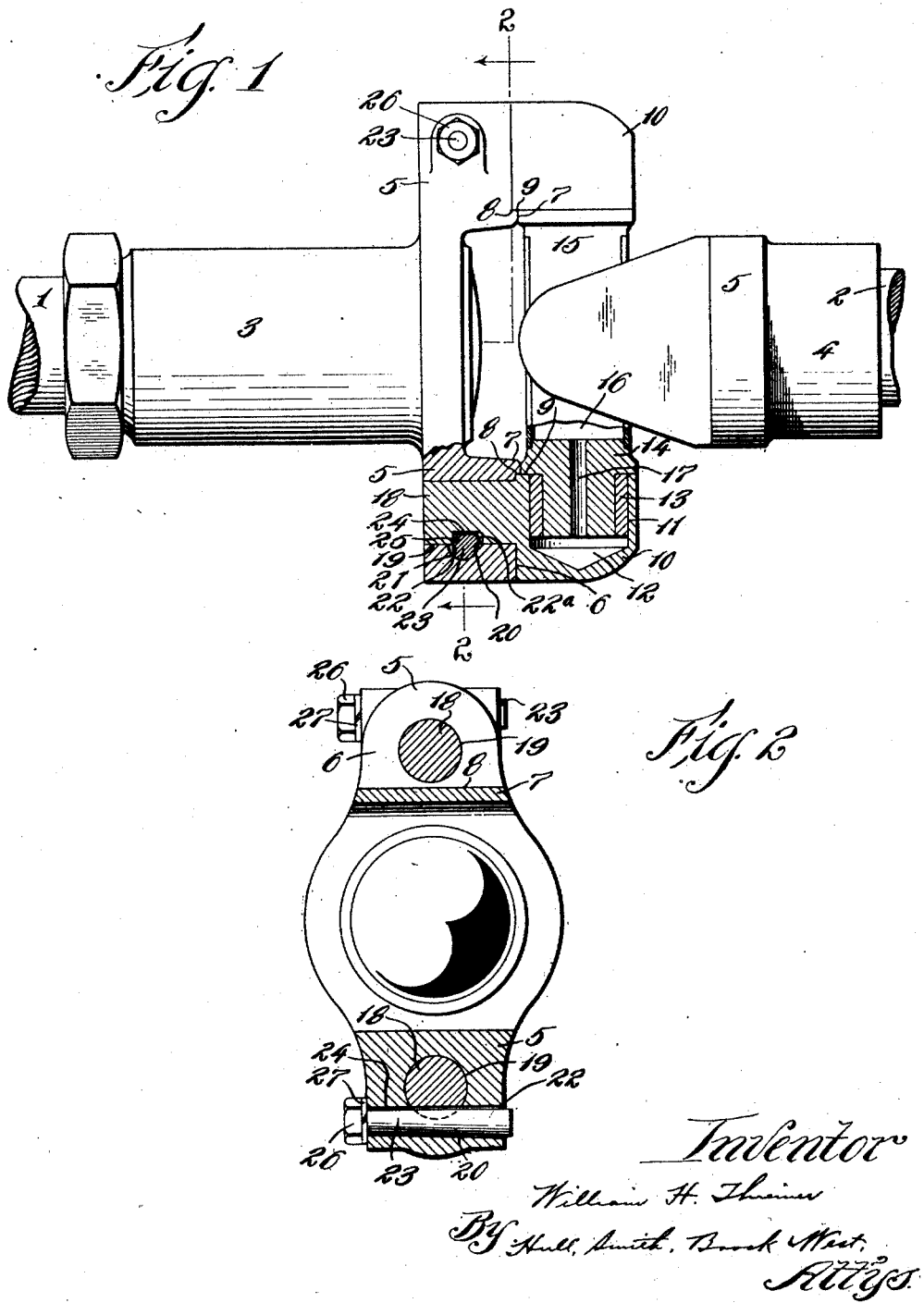

WILLIAM H. THIEMER, OF CLEVELAND, OHIO, ASSIGNOR TO THE PETERS MACHINE AND MANUFACTURING COMPANY, OF CLEVELAND, OHIO, A CORPORATION OF OHIO.

UNIVERSAL JOINT.

1,366,037.     Specification of Letters Patent.     Patented Jan. 18, 1921.

Application filed April 4, 1919. Serial No. 287,559.

*To all whom it may concern:*

Be it known that I, WILLIAM H. THIEMER, a citizen of the United States, residing at Cleveland, in the county of Cuyahoga and State of Ohio, have invented a certain new and useful Improvement in Universal Joints, of which the following is a full, clear, and exact description, reference being had to the accompanying drawings.

This invention relates to universal joints of the type wherein a pair of shaft sections are connected by a cross member having trunnions mounted in bearing blocks which are detachably mounted upon a supporting base or flange carried by each shaft section. It is the object of the invention to provide simple, effective, and economical means for securing the bearing blocks to their supporting bases. I accomplish the foregoing objects in and through the construction illustrated in the drawings forming a part hereof, wherein Figure 1 represents an elevation of two shaft sections united by a universal joint embodying my invention, certain parts being shown in section; and Fig. 2 a sectional view corresponding to the line 2—2 of Fig. 1.

Describing the various parts by reference characters, 1 and 2 denote the shaft sections which are united by the universal joint and 3 and 4 the hub members secured to said shaft sections, respectively. Each of these hub members is provided with a supporting base 5, and each supporting base is provided with a pair of seats 6 for bearing blocks. Each seat is shown as provided with a transverse rib 7 having a wall or face 8 which is adapted to engage the coöperating face 9 of a bearing block 10.

Each of the bearing blocks shown herein is provided with a bore 11 extending from the inner face thereof toward but not through the outer face, thereby providing a well 12 for lubricant. Mounted within each bore is a bushing 13 which receives therewithin the trunnion 14 of a cross member 15 having a central lubricant well 16 from which lubricant may be conducted through radial ports 17 in said trunnions to each of the wells 12, thereby to lubricate the bearing formed between the inner wall of the bushing 13 and the outer wall of the coöperating trunnion.

Each bearing block is provided with a stud 18 mounted within a bore 19 provided therefor in the appropriate side of its supporting base.

For the purpose of anchoring the bearing blocks upon their seats, the following construction is provided: Each stud 18 is provided with a slot 20 extending transversely of the outer face thereof and having a flat seat 21. Intersecting the bore 19 is a bore 22 extending across each side of the base 5, the upper wall 22$^a$ of said bore which faces the seat 6 being inclined.

Mounted within the bore 22 is a locking pin 23 having a straight flat face 24 coöperating with the slot 20 in the stud 18 and having also a flat face 25 adapted to engage the flat seat 21 of said slot. The bore 22 is shown as extending beyond the flat seat 21 of the slot 24. The smaller end of the pin 23 is reduced and threaded and provided with a nut 26, a split washer 27 being provided for the purpose of preventing the unscrewing of the nut.

With the parts constructed and arranged as described, each bearing block will be inserted within its appropriate bore with the slot 20 facing the tapered bore 22. The pin 23 will be inserted within the bore with the face 24 in the slot and the face 25 of the pin in position to engage the flat wall or seat 21 of said slot. By setting up on the nut 26, the pin 23 will be drawn along its bore and, because of the inclination of the bore, the pin, pressing upon the upper tapered surface of said bore, will in turn thrust upon the wall or seat 21 of the recess or slot which is remote from the seat 6, thereby forcing the bearing block to its seat.

Having thus described my invention, what I claim is:

1. In a universal joint, the combination of a supporting base having a seat and a bore extending from said seat and a bore extending transversely of and intersecting the first mentioned bore at one side thereof, the second bore being inclined on the side directed toward said seat, a bearing block having a stud projecting into the first bore, said stud being provided at one side thereof with a slot having a flat wall registering with the second bore, and an inclined locking pin mounted in the second bore and adapted to project into the first mentioned bore and into the said slot, the said pin having a flat wall coöperating with the flat wall of the slot, whereby, through the adjustment of the pin along its bore, the stud will be moved along the first mentioned bore to draw the bearing block to its seat.

2. In a universal joint, the combination of a supporting base having a seat and a bore extending from said seat and a bore extending transversely of and intersecting the first mentioned bore at one side thereof, the second bore being circular in cross section and inclined on the side thereof which is directed toward said seat, a bearing block having a stud projecting into the first bore, said stud being provided in one side thereof with a slot having a flat wall registering with the second bore and located above the portion of said bore which is remote from said seat, said wall being nearer to said seat than the inclined wall of the second bore, and a locking pin having an inclined rounded wall adapted to coöperate with the inclined wall of the second bore and having a flat wall opposed to such inclined wall and adapted to engage the flat wall of said slot, and means for moving said pin along the second bore and the slot thereby to draw the bearing block to its seat.

In testimony whereof, I hereunto affix my signature.

WILLIAM H. THIEMER.